T. AHLBORN.
WINDING DRUM.
APPLICATION FILED AUG. 26, 1910.

1,014,990.

Patented Jan. 16, 1912.

WITNESSES:
H. B. Burr.
Leta Crabtree.

INVENTOR
Theodore Ahlborn
BY G. C. Kennedy
ATTORNEY

UNITED STATES PATENT OFFICE.

THEODORE AHLBORN, OF CHICAGO, ILLINOIS, ASSIGNOR TO WATERLOO CEMENT MACHINERY CORPORATION, OF WATERLOO, IOWA.

WINDING-DRUM.

1,014,990.  Specification of Letters Patent.  Patented Jan. 16, 1912.

Application filed August 26, 1910. Serial No. 579,057.

*To all whom it may concern:*

Be it known that I, THEODORE AHLBORN, a citizen of the United States of America, and a resident of Chicago, Cook county, Illinois, have invented certain new and useful Improvements in Winding-Drums, of which the following is a specification.

Figure 1:
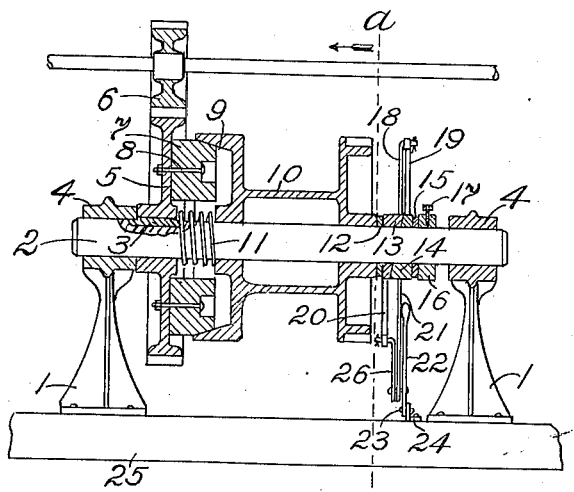
Figures 2, 3:
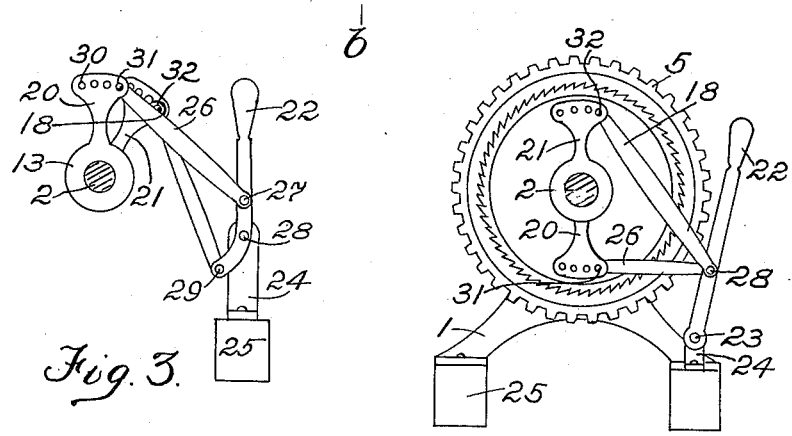
Figure 4:
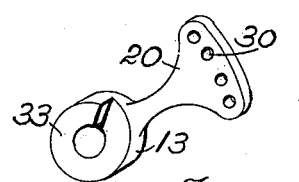
Figure 5:
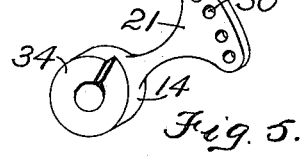

This invention relates to improvements in winding-drums, and the object of the improvement is to provide for a winding-drum simple and effective devices for engaging or disengaging the drum from its actuating means. This object is successively accomplished by the mechanism which is hereinafter described and claimed, and which is illustrated in the accompanying drawings, in which:

Figure 1 is a longitudinal vertical central section of my improved winding-drum and of its actuating, engaging and disengaging means. Fig. 2 is a transverse section of said mechanism taken on the line *a—b* of Fig. 1. Fig. 3 is a detail view of the shifting hand-lever and its connections to the coacting cams used to move the slidable drum along the shaft into frictional contact with the friction-cone on the driven gear-wheel. Fig. 4 is an enlarged detail view in perspective of the clutch on the cam-face of one of the rock-arms. Fig. 5 is a like view of the clutch on the cam-face of the other rock-arm adapted to contact and coact with the cam shown in Fig. 4.

Similar characters of reference designate corresponding parts throughout the several views.

In bearings 4 on upright frames 1 supported on base-blocks 25, are rotatably mounted the ends of a horizontal shaft 2. A key 3 serves to fix a gear-wheel 5 on this shaft, the teeth of said gear-wheel intermeshing with and being driven by the teeth of a pinion 6 mounted on an overhanging power shaft. To the right-hand face of said gear-wheel 5 bolts 8 secure a friction-rim with coned circumferential surface adapted to fit within an interiorly-coned outwardly-directed flanged annulus on the left-hand face of the winding-drum 10, as shown in Fig. 1 at 7 and 9. Said winding-drum 10 is rotatable on the shaft 2. A friction-ring 12 is loosely mounted on the shaft 2 abutting upon the right-hand face of the right-hand hub of said drum 10, and abutting upon said friction-ring on said shaft to its right are the coacting cams 13 and 14. The cam-face of the cam 13 has a clutch-detent 33 which is adapted to engage a similar detent or shoulder 34 on the cam-face of the cam 14. The faces of said cams form a helical plane in each case of the same pitch. The cam 13 has a radial arm 20 whose outer end is broadened and supplied with an arc-shaped row of orifices 30. The other cam 14 also has a radial arm 21 whose broadened end has a similar row of orifices 30. Abutting upon the right-hand face of the cam 14 and loosely mounted on said shaft 2 is another friction- or wearing-ring 15. Abutting upon the right-hand face of the ring 15 is a collar 16 which is fixedly secured to said shaft 2 by means of a set-screw 17.

The numeral 22 designates a hand-lever which is pivoted to an upright 24 on one of the base-blocks 25.

In Figs. 2 and 3 are shown different specific but equivalent modes of operatively connecting the hand-lever 22 to the rock-arms 20 and 21 on the cams 13 and 14 respectively. In Fig. 2 links 18 and 26 are both pivoted at one medial pivot 28 to the lever 22, their other ends being connected to pivots 32 and 31 respectively in similarly located orifices 30 in the rock-arms 21 and 20. In this arrangement, where the rock-arms are oppositely projected, the said links act, when the lever 22 is shifted in one direction, to both pull said arms toward each other, which so causes the cam-faces to move over each other as to thrust them apart. This also thrusts the winding-drum 10 to the left, where its inner coned left-hand flange frictionally engages the coned outer surface of the rim 7, the gear-wheel 5 then causing a rotation of the drum. A coiled compression-spring 11 is seated about the shaft 2 and engaged between the left-hand hub of said drum and the right-hand face of said gear-wheel within the central opening of said rim 7. When the drum slides to the left, said spring is compressed, and when the hand-lever 22 is released by the operator, the spring 11 recoils driving back said drum 10, and causing the cams 13 and 14 to rock back to their former position, where their clutches by their engagement prevent further rocking movement. In the arrangement of parts as shown in Fig. 3, the rock-arm 20 is connected to said lever 22 by means of a li link 26 pivoted to the lever at a medial pivot 27, while the rock-arm 21 is connected to said lever by means of a link 18 pivoted to the lever on a pivot 29 at the lower end of the lever, the lever itself being pivoted at 28 to the upright 24 midway between the pivotal connections of said links. The links 26 and 18 act herein to pull and push respectively upon their connected rock-arms to actuate the said cams 13 and 14 in a similar manner to that hereinbefore described.

Having described my invention, what I claim as new, and desire to secure by Letters Patent, is:

In combination, a rotatable shaft, a hub carrying a hollow friction-cone fixed on said shaft, a body having a friction-rim rotatably and slidably mounted on said shaft, a cam-body having a helical cam-face mounted movably on said shaft to rock thereon, another cam-body having a like helical cam-face mounted on said shaft to rock thereon, the said helical cam-faces being in coacting engagement, a compression-spring engaged between said friction-cone hub and said friction-rim carrying-body, an arm projecting from each of said bodies, each arm having its outer end broadened and provided with a plurality of adjusting orifices, a pivoted hand-lever, and suitable link-connections between said lever and said arms adjustably connected with certain of the said orifices in said arms, said cam-bodies when rocked past each other being adapted to thrust said friction-rim carrying-body toward said friction-cone, compressing said spring and also placing said friction-rim into frictional driving engagement with said friction-cone.

Signed at Chicago, Ills., this 10th day of Aug. 1910.

THEODORE AHLBORN.

Witnesses:
HENRY B. REID,
MARY F. LINCOLN.

---

Copies of this patent may be obtained for five cents each, by addressing the "Commissioner of Patents, Washington, D. C."